United States Patent
Nagai et al.

(10) Patent No.: US 7,007,221 B2
(45) Date of Patent: Feb. 28, 2006

(54) DATA REPRODUCING CONTROLLER

(75) Inventors: Hiroki Nagai, Gifu-ken (JP); Shin-ichiro Tomisawa, Mizuho (JP)

(73) Assignee: Sanyo Electric Co., Ltd., Osaka (JP)

(*) Notice: Subject to any disclaimer, the term of this patent is extended or adjusted under 35 U.S.C. 154(b) by 412 days.

(21) Appl. No.: 10/439,939

(22) Filed: May 16, 2003

(65) Prior Publication Data

US 2004/0015772 A1    Jan. 22, 2004

(30) Foreign Application Priority Data

May 17, 2002 (JP) .............................. 2002-142969

(51) Int. Cl.
*H03M 13/00* (2006.01)

(52) U.S. Cl. ...................................... 714/755
(58) Field of Classification Search ............ None
See application file for complete search history.

(56) References Cited

U.S. PATENT DOCUMENTS

| 5,051,998 A | * | 9/1991 | Murai et al. ................. 714/762 |
| 6,760,878 B1 | * | 7/2004 | Yashima ..................... 714/755 |
| 6,772,386 B1 | * | 8/2004 | Iwata et al. ................. 714/755 |

* cited by examiner

*Primary Examiner*—Shelly Chase
(74) *Attorney, Agent, or Firm*—Fish & Richardson P.C.

(57) ABSTRACT

A data reproducing controller for operating a device for reproducing data at a high speed, which is recorded on a disc and includes an error correction code. A PI correction circuit performs an error correction process on a PI and causes a completion signal to go high whenever processing of 182 bytes of data is completed. A counter circuit sequentially increments a count value whenever the completion signal goes high. A determination circuit compares the count value with a predetermined set value and determines whether the data of which PI has undergone the error correction process is a PO row based on the comparison. The determination circuit causes a first control signal to go low when the data is a PO row. A descrambling circuit skips the data that is determined to be a PO row.

12 Claims, 6 Drawing Sheets

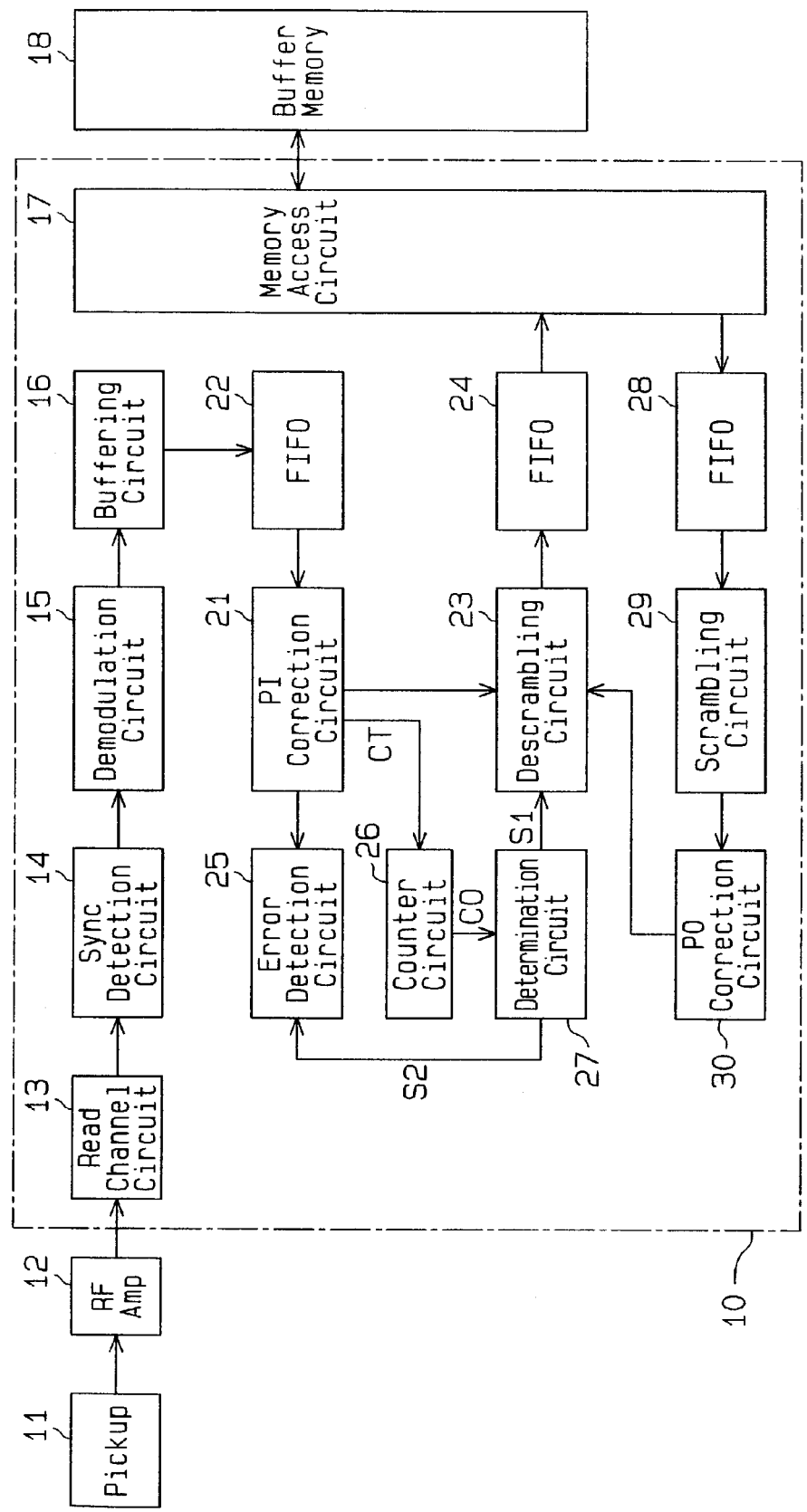

DATA REPRODUCING CONTROLLER

CROSS-REFERENCES TO RELATED APPLICATIONS

This application is based upon and claims the benefit of priority from prior Japanese Patent Application No. 2002-142969 filed on May 17, 2002, the entire contents of which are incorporated herein by reference.

BACKGROUND OF THE INVENTION

The present invention relates to data reproducing technology, and more particularly, to a data reproducing controller for controlling a data reproducing device that reproduces data, which is recorded on a recording medium and to which an error correction code is added.

Generally, when recording data on a recording medium, an error detection code (EDC) and an error correction code are added to the data to reproduce the data with high reliability.

For example, a DVD recording device, which uses a digital versatile disc (DVD) as a recording medium, records data as described below.

Referring to FIG. 1, the data subject to recording (main data) is divided into units of 2048 bytes. A header consisting of 12 bytes is added to the head of each piece of main data. An error detection code (EDC) consisting of 4 bytes is added to the end of each piece of main data. This configures segments of sector data having 2064 bytes. Each data sector is configured by 12 rows with each row having 172 bytes.

The sector data is scrambled to generate scrambled data. Referring to FIG. 2, 16 rows of an outer code parity (PO) and 10 columns of an inner code parity (PI) are added to 16 pieces of successive scrambled data (i.e., 172 bytes×192 rows) to generate an error check and correction (ECC) block. The ECC block has 208 rows with each row having 182 bytes (182 bytes×208 rows).

The PI added to each row is generated based on the 172 bytes of data included in the row. Further, the PO added to each column is generated based on the 192 bytes of data included in the column.

The ECC block is further converted as shown in FIG. 3. More specifically, each of the 16 rows of the PO are shifted to a position following one of the 16 pieces of sector data so that one row of the PO is arranged subsequent to each piece of sector data to which the PI is added. A recording sector is configured from 13 rows of data with each row having 182 bytes. The 13 rows of the recording sector includes 12 rows, each having 172 bytes, 12 rows of the PI, each having 10 bytes, and 1 row of the PO having 182 bytes.

The recording sector is modulated to generate recording data. The recording data is converted to serial data and written to a DVD.

The reproduction of the recording data to which the error correction code is added will now be discussed with reference to FIG. 4. In FIG. 4, a data reproducing controller 100, which controls the reproduction of data, is illustrated in the broken line.

An RF amplifier 112 amplifies a signal, which is detected by a pickup 111, and provided to a read channel circuit 113. In response to the signal, the read channel circuit 113 generates a binary signal and samples the binary signal in accordance with a read channel clock signal, which has a predetermined frequency. A synchronization detection circuit 114 detects a synchronizing signal from the sampled signal and extracts data from the sampled signal based on the synchronizing signal. A demodulation circuit 115 demodulates the extracted data and provides the demodulated data to a buffering circuit 116. Whenever a predetermined amount of the demodulated data is accumulated, the buffering circuit 116 writes the accumulated demodulated data to a buffer memory 118, which is configured by a dynamic random access memory (DRAM), via a memory access circuit 117.

When the amount of data written to the buffer memory 118 reaches one ECC block or more, a PI correction circuit 121 sends a request to the buffer memory 118 for reading part of the data in the buffer memory 118 that requires error correction. In response to the data read request, the buffer memory 118 sequentially provides the requested data to a first in first out (FIFO) 122 via the memory access circuit 117. When one row of an ECC block, or 182 bytes of data, is accumulated in the FIFO 122, the PI correction circuit 121 reads the data from the FIFO 122 and performs an error correction process on an error correction code (PI), which is included in the row of data. The PI correction circuit 121 provides the data that has undergone error correction to a descrambling circuit 123. The descrambling circuit 123 descrambles the data and provides the data to an FIFO 124. Whenever a row of data is accumulated, the FIFO 124 writes the data to the buffer memory 118 via the memory access circuit 117. In this manner, the buffer memory 118 stores the data that has undergone the error correction.

An error detection circuit 125 performs error detection on the data of the PI that has undergone the error correction process. The error detection result is held in the error detection circuit 125 for a predetermined period to enable an external circuit to refer to the result.

From the data stored in the buffer memory 118, a scrambling circuit 127 reads and scrambles the data that has been descrambled by the descrambling circuit 123. A PO correction circuit 128 performs error correction on the PO in the data that has undergone scrambling and provides the corrected data to the descrambling circuit 123. The descrambling circuit 123 descrambles the received data and writes the descrambled data to the buffer memory 118 via the FIFO 124 and the memory access circuit 117.

In addition to the access via the memory access circuit 117, the buffer memory 118 is accessed by other circuits and devices, such as a microcomputer (not shown). As the frequency in which the buffer memory 118 is accessed increases, the time for waiting to access the buffer memory 118 increases. The lengthened wait time increases the time required to perform the above series of processes, which control data reproduction, and the time required to access the buffer memory 118 with other devices. Thus, it is difficult to increase the speed for reproducing the recording data from the DVD.

SUMMARY OF THE INVENTION

In one aspect of the present invention, a data reproducing controller controls reproduction of recording data. The recording data is in sectors with each sector including a predetermined number of rows of scrambled data with each row having a predetermined number of bytes. A first error correction code is added to each row of the scrambled data. A second correction code is added to the predetermined number of rows of scrambled data. The data reproducing controller includes a first error correction circuit for performing a first error correction process on each row of the scrambled data in accordance with the first error correction code and for generating a completion signal whenever the first error correction process of each row of the scrambled data is completed. A descrambling circuit is connected to the first error correction circuit for performing a descrambling process on the scrambled data that has undergone the first error correction process to generate descrambled data. A counter is connected to the first error correction circuit for counting the completion signal to generate a count value. A determination circuit is connected to the counter to detect a timing at which the second error correction code is provided to the descrambling circuit from the count value. The determination circuit inactivates the descrambling process when the second error correction code is provided to the descrambling circuit.

A further aspect of the present invention is a data reproducing controller for controlling reproduction of recording data recorded on a disc in sectors. Each sector of the recording data includes a predetermined number of rows of scrambled data with each row having a predetermined number of bytes, a first error correction code added to each row of the scrambled data, a second correction code added to the predetermined number of rows of scrambled data, and an error detection code. The data reproducing controller includes a demodulation circuit for generating scrambled data demodulated from a signal retrieved from the disc. A buffering circuit connected to the demodulation circuit stores the scrambled data. A first error correction circuit performs a first error correction process on the scrambled data in accordance with the first error correction code and generates a completion signal whenever the first error correction process of the scrambled data is completed. The scrambled data is provided to the first error correction circuit without being sent out of the data reproducing controller from the buffering circuit. A descrambling circuit connected to the first error correction circuit performs a descrambling process on the scrambled data that has undergone the first error correction process to generate descrambled data. A counter connected to the first error correction circuit counts the completion signal to generate a count value. A determination circuit connected to the counter detects a timing at which the second error correction code is provided to the descrambling circuit from the count value. The determination circuit inactivates the descrambling process when the second error correction code is provided to the descrambling circuit. An error detection circuit connected to the correction circuit and the determination circuit performs an error detection process in accordance with the error detection code on the scrambled data that has undergone the first error correction process. The error detection circuit skips the error detection process of the second error correction code when the determination circuit provides the error detection circuit with a signal indicating that the second error detection code has been provided to the descrambling circuit.

A further aspect of the present invention is a method for controlling reproduction of recording data that is recorded on a recording medium. Each sectors of the recording data includes a predetermined number of rows of scrambled data with each row having a predetermined number of bytes. A first error correction code is added to each row of the scrambled data. A second correction code is added to the predetermined number of rows of scrambled data. The method includes performing an error correction process on the scrambled data in accordance with the first error correction code, generating a completion signal whenever the error correction process of the scrambled data is completed, performing a descrambling process on the scrambled data that has undergone the error correction process, counting the completion signal to generate a count value, detecting a timing at which the second error correction code will be subjected to the descrambling process, and skipping the descrambling process for the second error code.

BRIEF DESCRIPTION OF THE DRAWINGS

The invention, together with objects and advantages thereof, may best be understood by reference to the following description of the presently preferred embodiments together with the accompanying drawings in which:

FIG. 7 is a block diagram illustrating a data reproducing controller according to a further embodiment of the present invention.

DETAILED DESCRIPTION OF THE PREFERRED EMBODIMENTS

A data reproducing controller according to a preferred embodiment of the present invention will now be discussed with reference to FIGS. 5 and 6. The data reproducing controller 10 controls the reproducing of recording data, to which an error correction code has been added, recorded on a recording medium (DVD) 1.

Figure 1:
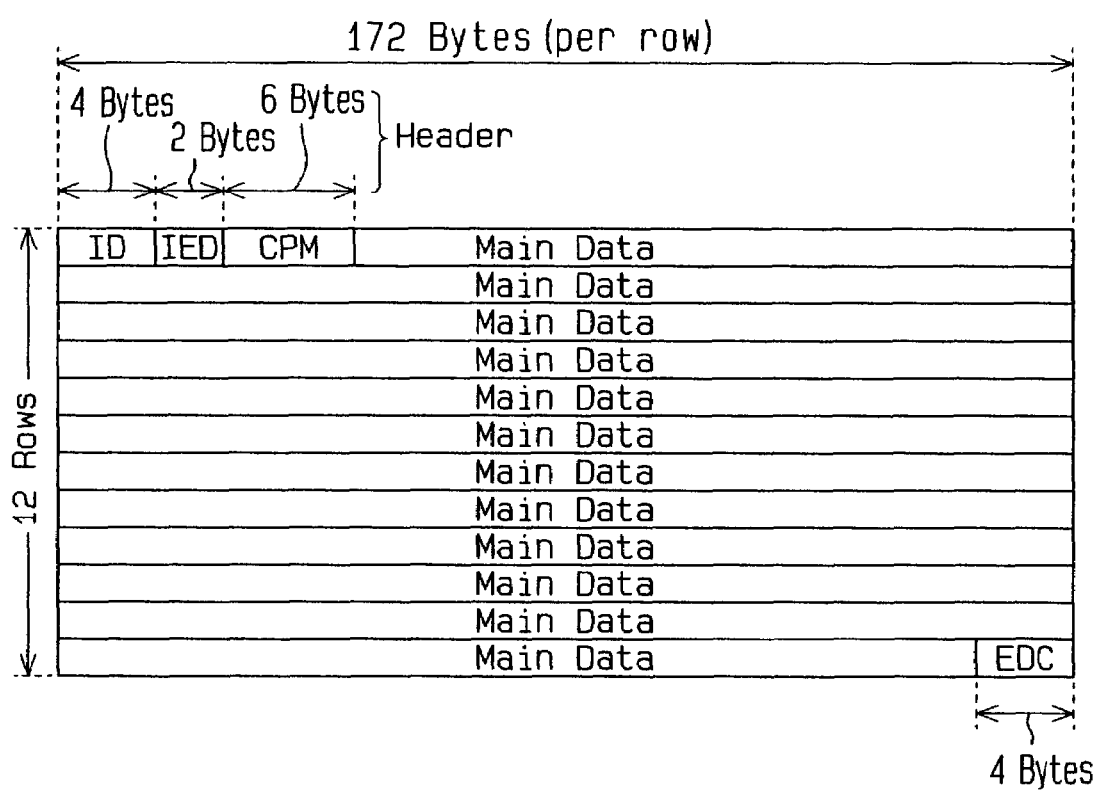
FIG. 1 is a diagram illustrating sector data of a DVD.
Figure 2:
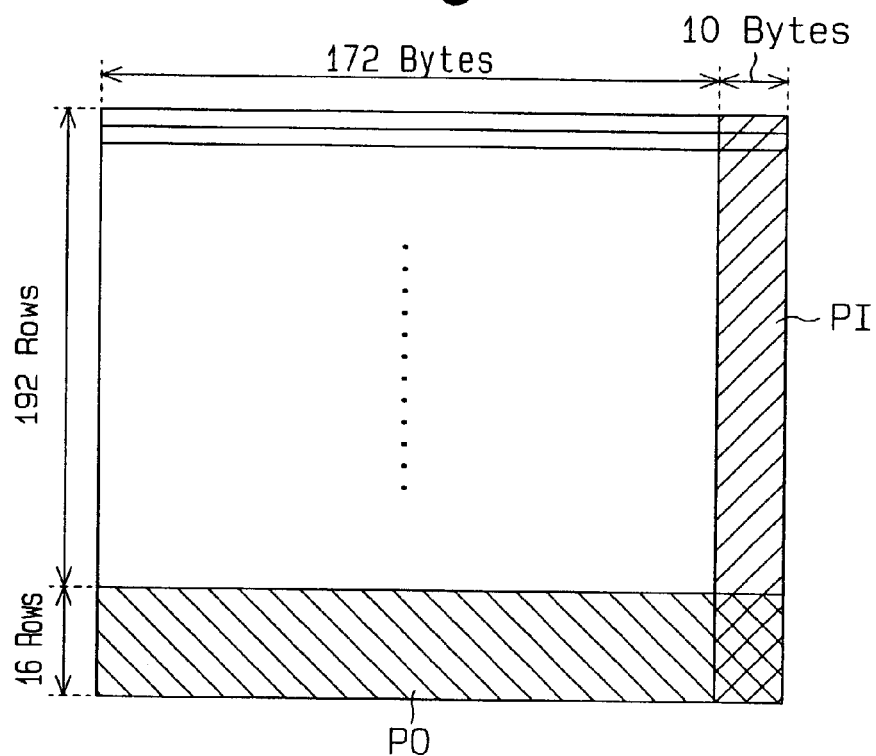
FIG. 2 is a diagram illustrating an ECC block of a DVD.
Figure 3:
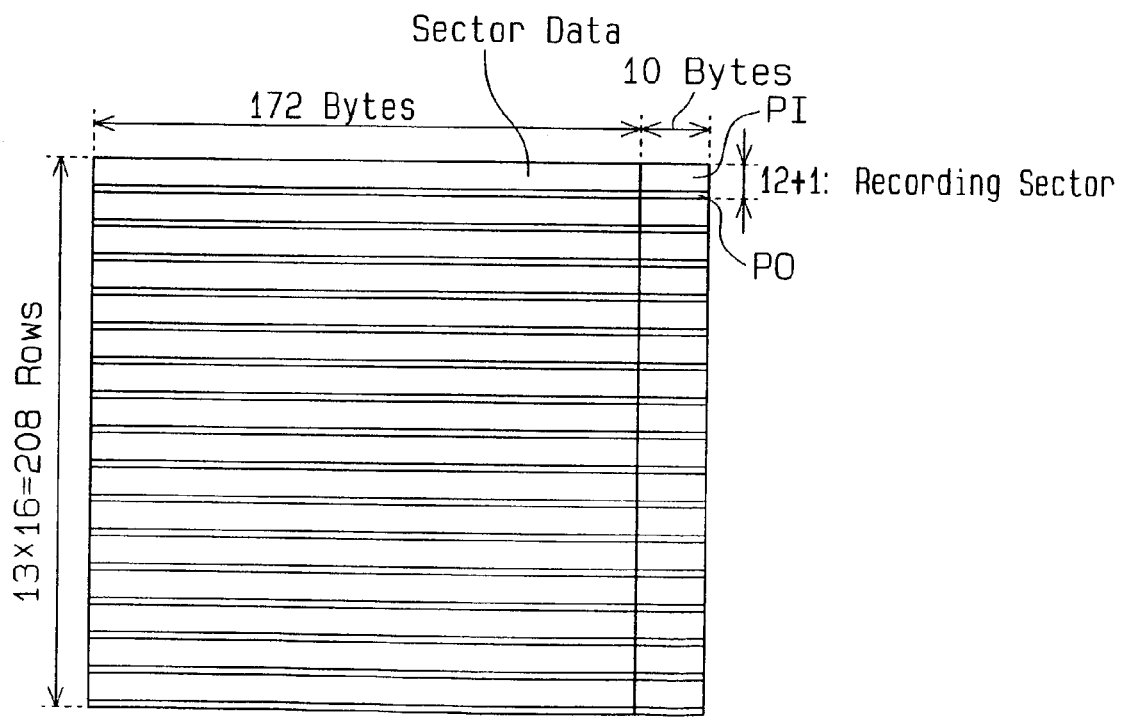
FIG. 3 is a diagram illustrating a recording sector and the shifting of an ECC block.
Figure 5:
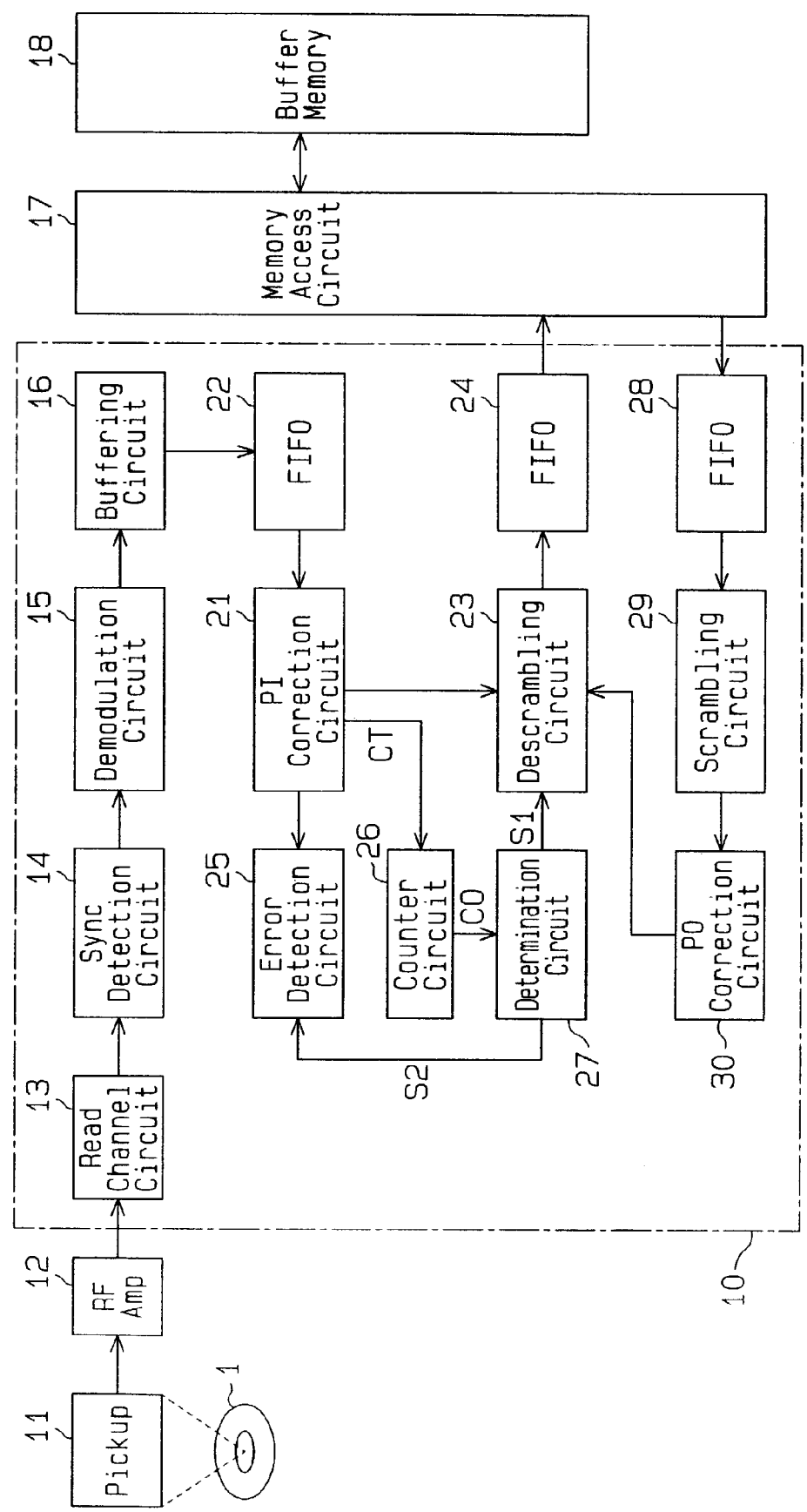
FIG. 5 is a block diagram illustrating a data reproducing controller according to a preferred embodiment of the present invention.

Referring to FIG. 5, an RF amplifier 12 amplifies a signal detected by a pickup 11 from a DVD 1. The read channel circuit 13 generates a binary signal from the amplified signal and samples the binary signal in accordance with a read channel clock signal, which has a predetermined frequency. A synchronization detection circuit 14 detects a synchronizing signal from the sampled signal and extracts data from the sampled signal based on the synchronizing signal. A demodulation circuit 15 demodulates the extracted data and provides the demodulated data to an FIFO 22 via a buffering circuit 16. Accordingly, the demodulated data is not written to the buffer memory 18, which is an external memory configured by a DRAM. A PI correction circuit 21 reads the data held in the FIFO 22 in units of rows, or 182 bytes, of an ECC block and performs error correction on the PI (refer to FIGS. 2 and 3) included in the row. Whenever the error correction of the PI in the 182 bytes of data is completed, the PI correction circuit 21 causes a completion signal CT to go high. A descrambling circuit 23 retrieves the data of which PI has undergone error correction and descrambles the retrieved data. An FIFO 24 retrieves the descrambled data and, whenever a row of data is accumulated, writes the data to the buffer memory 18 via a memory access circuit 17.

An error detection circuit 25 performs error detection on the data of the PI that has undergone the error correction process to determine whether an error is included in the data. The error detection result is held in the error detection circuit 25 for a predetermined period to enable an external circuit to refer to the result.

The signal detected from the DVD 1 is processed by the read channel circuit 13, the synchronization detection circuit 14, and the demodulation circuit 15 and read as recorded data. All of the recording data undergoes error correction, descrambling, and error detection. However, the recording data is configured by the recording sector shown in FIG. 3. Since the PI is retrieved in the descrambling circuit 23 after the PI has undergone error correction, there is no problem even if the PI is descrambled simultaneously with the recording sector. Among the 13 rows of data in the recording sector, the final row of data (PO row) is configured by a PO, which is generated and added as an error correction code. Accordingly, there is no need for the PO row to undergo descrambling and error detection.

The data reproducing controller 10 includes a counter circuit 26 and a determination circuit 27. The counter circuit 26 counts the number of error corrections performed on the recording data that is held by the FIFO 22 in units of rows. Further, the counter circuit 26 counts the completion signal CT output from the PI correction circuit 21 and increments the count value CO from "0" one at a time whenever the completion signal CT goes high. That is, the count value CO indicates the number of rows, in which the PI has undergone error correction. The determination circuit 27 compares the count value CO with a predetermined set value K, which is stored in the determination circuit 27, to determine the PO row included in the data output from the PI correction circuit 21 and generates first and second control signals S1 and S2, which have a level that is in accordance with the determination result.

Figure 6:
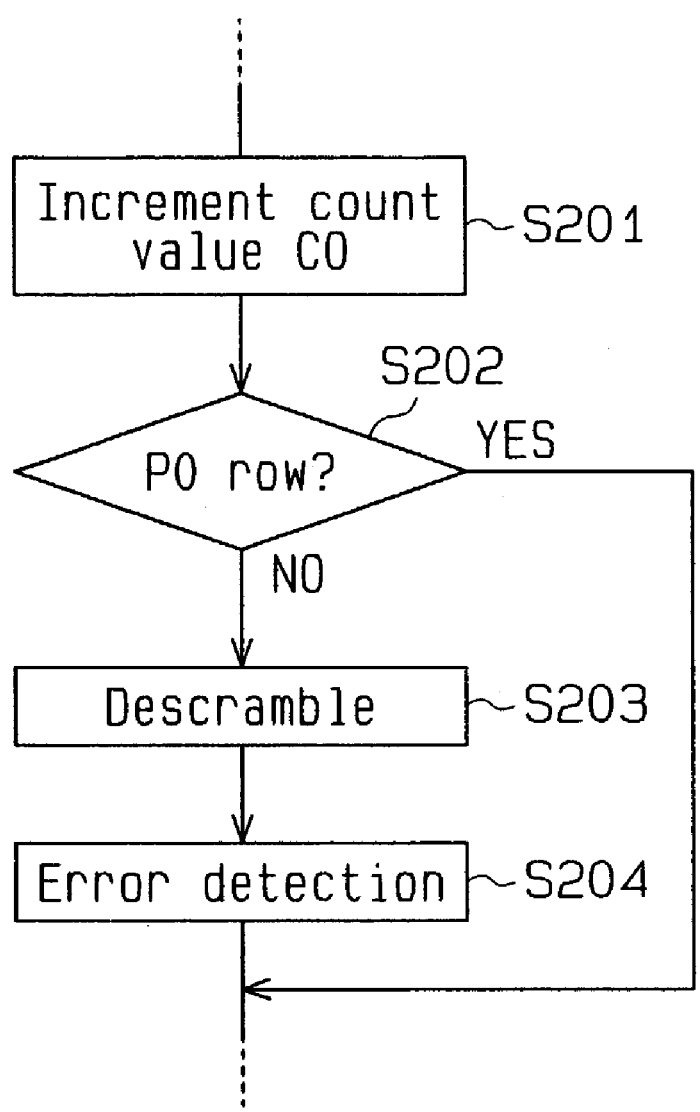
FIG. 6 is a flowchart illustrating an error correction process, a descrambling process, and an error detection process, which are performed in the preferred embodiment of the present invention.

FIG. 6 is a flowchart illustrating the processing performed by the counter circuit 26 and the determination circuit 27. In step S201, the counter circuit 26 increments the count value CO in accordance with the completion signal CT, which is output from the PI correction circuit 21.

In step S202, the determination circuit 27 compares the count value CO with a predetermined set value K and determines whether the data output from the PI correction circuit 21 is a PO row or not. The set value K is set under the fact that the final row of a recording sector is a PO row and that it is a value of which remainder is "12" when divided by "13." More specifically, the set value K is "12," "25," "38," . . . , or "207." That is, whenever the PI of 182 bytes (one row) of data undergoes error correction, the count value CO is incremented and the PI of the PO row following the 12 rows of data undergoes error correction. It can thus be determined that the PO row is the data when the count value CO matches the set value K.

When comparing the count value CO and the set value K, if the two values do not match and it is determined that the data of which PI has completed the error correction is not the PO row (NO in step S202), the determination circuit 27 causes the first and second control signals S1 and S2 to go high. In step S203, the descrambling circuit 23 descrambles the data of which PI has completed the error correction in response to the high first and second control signals S1 and S2. In step S204, the error detection circuit 25 performs error detection.

On the other hand, if the count value CO and the set value K are matched and determined that the data of which PI has completed the error correction is a PO row (YES in step S202), the determination circuit 27 provides the descrambling circuit 23 with the first control signal S1 at a low level so that the descrambling is not performed. Further, since an EDC is not added to the PO row, the determination circuit 27 provides the error detection circuit 25 with the second control signal S2 at a low level so that the PO row is not subject to error detection. As a result, steps S203 and S204 are skipped and the PO row is stored in the buffer memory 18 via the FIFO 24 and the memory access circuit 17 without undergoing descrambling and error detection.

In the processing of FIG. 6, the counter circuit 26 resets the count value CO in synchronism with the synchronization signal detected for each block. The count resetting constantly enables determination of whether the data of which PI has completed the error correction is a PO row.

In this manner, the PO row in the recording data read from the DVD 1 undergoes error correction and is provided to the FIFO 24. The rows excluding the PO row undergo error correction, descrambling, and error detection. The descrambled data read from the FIFO 24 is written to the buffer memory 18 via the memory access circuit 17.

Further, the scrambling circuit 29 scrambles the data stored in the buffer memory 18. The PO correction circuit 30 performs error correction on the PO of the scrambled data. The data of which PO has completed error correction is descrambled again by the descrambling circuit 23 and is stored in the buffer memory 18.

The data reproducing controller 10 of the preferred embodiment has the advantages described below.

Figure 4:
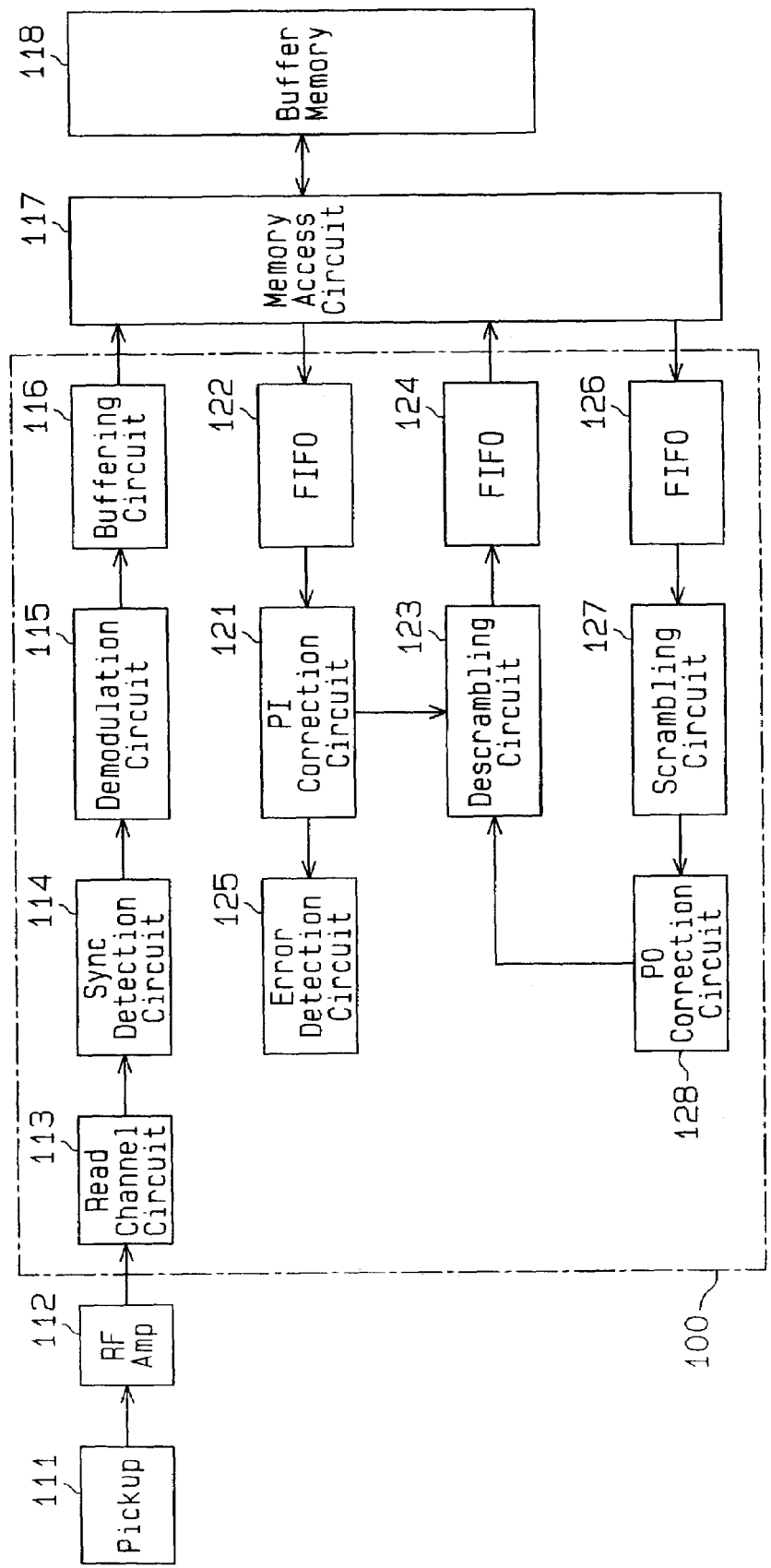
FIG. 4 is a block diagram illustrating a prior art DVD reproducing controller.

(1) The read channel circuit 13, the synchronization detection circuit 14, and the demodulation circuit 15 demodulates recording data from the signal that is detected from the DVD 1 and amplified. The data reproducing controller 10 performs error correction on the demodulated data and outputs the data that has undergone the error correction to an external device without transferring the demodulated data to the buffer memory 18. That is, in the data reproducing controller 10, there is no need to temporarily write the demodulated data to the buffer memory 18 and read the demodulated data again from the buffer memory 18 (in the prior art example of FIG. 4, the processing from the buffering circuit 116 to the memory access circuit 117 and then to the buffer memory circuit 118 and the processing from the buffer memory 118 to the memory access circuit 117 and then to the FIFO 122). Accordingly, the frequency for accessing the buffer memory 18 from the data reproducing controller 10 during error correction is reduced to one third in comparison with the prior art data reproducing controller 100. This reduces the waiting time for accessing the buffer memory 18 and facilitates high speed processing, such as 2× speed reproduction.

(2) The counter circuit 26 and the determination circuit 27 determine whether the row of the recording data that is to be processed is a PO row. The data reproducing controller 10 performs descrambling and error detection in accordance with the determination result. Thus, the error correction and the error detection are performed optimally, and the properly descrambled data is stored in the buffer memory 18. Thus, the data reproducing controller 10 performs the series of processing from the error correction of the PI to descrambling inside the data reproducing controller 10 without temporarily storing the retrieved data in the external buffer memory 18. Accordingly, the number of times the external buffer memory 18 is accessed by the data reproducing controller 10 decreases. This guarantees the time for accessing the buffer memory 18 to perform other processes.

It should be apparent to those skilled in the art that the present invention may be embodied in many other specific forms without departing from the spirit or scope of the invention. Particularly, it should be understood that the present invention may be embodied in the following forms.

The error correction, descrambling, and error detection may be performed in parallel or sequentially.

The buffering circuit 16 and the FIFO 22 are employed in the preferred embodiment for the PI correction circuit 21 to read the recording data, which has been demodulated by the demodulation circuit 15. However, for example, a single circuit having the functions of the buffering circuit 16 and the FIFO 22 may be employed in lieu of the buffering circuit 16 and the FIFO 22 It is only required that the PI correction circuit 21 properly read the recording data demodulated by the demodulation circuit 15 in units of single rows.

In the preferred embodiment, the memory access circuit 17 is located outside the data reproducing controller. However, the memory access circuit 17 may be arranged in the data reproducing controller 10, as shown in FIG. 7

The data reproducing controller 10 controls data reproduction of a data reproducing device that uses the DVD 1 as a recording medium. However, the recording medium is not limited to the DVD 1, and the present invention may also be applied to any data reproducing controller that controls the reproduction of the recording data to which the error correction code is added.

The present examples and embodiments are to be considered as illustrative and not restrictive, and the invention is not to be limited to the details given herein, but may be modified within the scope and equivalence of the appended claims.

What is claimed is:

1. A data reproducing controller for controlling reproduction of recording data, wherein the recording data is in sectors with each sector including a predetermined number of rows of scrambled data with each row having a predetermined number of bytes, a first error correction code added to each row of the scrambled data, a second correction code added to the predetermined number of rows of scrambled data, the data reproducing controller comprising:
   a first error correction circuit for performing a first error correction process on each row of the scrambled data in accordance with the first error correction code and for generating a completion signal whenever the first error correction process of each row of the scrambled data is completed;
   a descrambling circuit connected to the first error correction circuit for performing a descrambling process on the scrambled data that has undergone the first error correction process to generate descrambled data;
   a counter connected to the first error correction circuit for counting the completion signal to generate a count value; and
   a determination circuit connected to the counter to detect a timing at which the second error correction code is provided to the descrambling circuit from the count value, wherein the determination circuit inactivates the descrambling process when the second error correction code is provided to the descrambling circuit.

2. The data reproducing controller according to claim 1, wherein each sector of the recording data includes an error detection code, the controller further comprising:
   an error detection circuit connected to the correction circuit and the determination circuit to perform an error detection process in accordance with the error detection code on the scrambled data that has undergone the first error correction process, wherein the error detection circuit skips the error detection process of the second error correction code when the determination circuit provides the error detection circuit with a signal indicating that the second error detection code has been provided to the descrambling circuit.

3. The data reproducing controller according to claim 2, further comprising:
   an access circuit for storing the descrambled data in a buffer memory.

4. The data reproducing controller according to claim 1, wherein the descrambling circuit stores the descrambled data in a buffer memory via an access circuit.

5. The data reproducing controller according to claim 4, further comprising:
   a scrambling circuit for retrieving and performing a scrambling process on the descrambled data stored in the buffer memory; and
   a second error correction circuit connected to the scrambling circuit to perform a second error correction process on the scrambled data in accordance with the second error correction code.

6. The data reproducing controller according to claim 1, wherein the determination circuit compares the count value with a predetermined set value to detect the timing.

7. The data reproducing controller according to claim 1, wherein the recording data is recorded on a disc, the recording controller further comprising:
   a demodulation circuit for generating scrambled data demodulated from a signal retrieved from the disc; and
   a buffering circuit connected to the demodulation circuit to store the scrambled data, wherein the scrambled data is not sent out of the data reproducing controller from the buffering circuit.

8. A data reproducing controller for controlling reproduction of recording data recorded on a disc in sectors, wherein each sector of the recording data includes a predetermined number of rows of scrambled data with each row having a predetermined number of bytes, a first error correction code added to each row of the scrambled data, a second correction code added to the predetermined number of rows of scrambled data, and an error detection code, the data reproducing controller comprising:
   a demodulation circuit for generating scrambled data demodulated from a signal retrieved from the disc;
   a buffering circuit connected to the demodulation circuit to store the scrambled data;
   a first error correction circuit for performing a first error correction process on the scrambled data in accordance with the first error correction code and for generating a completion signal whenever the first error correction process of the scrambled data is completed, wherein the scrambled data is provided to the first error correction circuit without being sent out of the data reproducing controller from the buffering circuit;
   a descrambling circuit connected to the first error correction circuit for performing a descrambling process on the scrambled data that has undergone the first error correction process to generate descrambled data;
   a counter connected to the first error correction circuit for counting the completion signal to generate a count value;
   a determination circuit connected to the counter to detect a timing at which the second error correction code is provided to the descrambling circuit from the count value, wherein the determination circuit inactivates the descrambling process when the second error correction code is provided to the descrambling circuit; and
   an error detection circuit connected to the correction circuit and the determination circuit to perform an error detection process in accordance with the error detection code on the scrambled data that has undergone the first error correction process, wherein the error detection circuit skips the error detection process of the second error correction code when the determination circuit provides the error detection circuit with a signal indicating that the second error detection code has been provided to the descrambling circuit.

9. The data reproducing controller according to claim 8, wherein the descrambling circuit stores the descrambled data to a buffer memory via an access circuit, the data reproducing controller further comprising:
   a scrambling circuit for retrieving and performing a scrambling process on the descrambled data stored in the buffer memory; and
   a second error correction circuit connected to the scrambling circuit to perform a second error correction process on the scrambled data in accordance with the second error correction code.

10. A method for controlling reproduction of recording data that is recorded on a recording medium, wherein each sector of the recording data includes a predetermined number of rows of scrambled data with each row having a predetermined number of bytes, a first error correction code added to each row of the scrambled data, a second correction code added to the predetermined number of rows of scrambled data, the method comprising:
   performing an error correction process on the scrambled data in accordance with the first error correction code;
   generating a completion signal whenever the error correction process of the scrambled data is completed;
   performing a descrambling process on the scrambled data that has undergone the error correction process;
   counting the completion signal to generate a count value;
   detecting a timing at which the second error correction code will be subjected to the descrambling process; and
   skipping the descrambling process for the second error code.

11. The method according to claim 10, wherein each sector of the recording data includes an error detection code, the method further comprising:
   performing an error detection process in accordance with the error detection code on the scrambled data that has undergone the error correction process; and
   skipping the error detection process of the second error correction code when skipping the descrambling process of the second error detection code.

12. The method according to claim 10, wherein the recording data is recorded on a disc, the method further comprising:
   demodulating a signal retrieved from the disc to generate the scrambled data; and
   temporarily storing the scrambled data without having the scrambled data sent out of the reproducing controller, wherein said demodulating and said temporarily storing are performed prior to said performing an error correction process.

* * * * *